(No Model.)
W. H. LAFAELLE.
POWER SHIPPING MECHANISM.
No. 420,160. Patented Jan. 28, 1890.
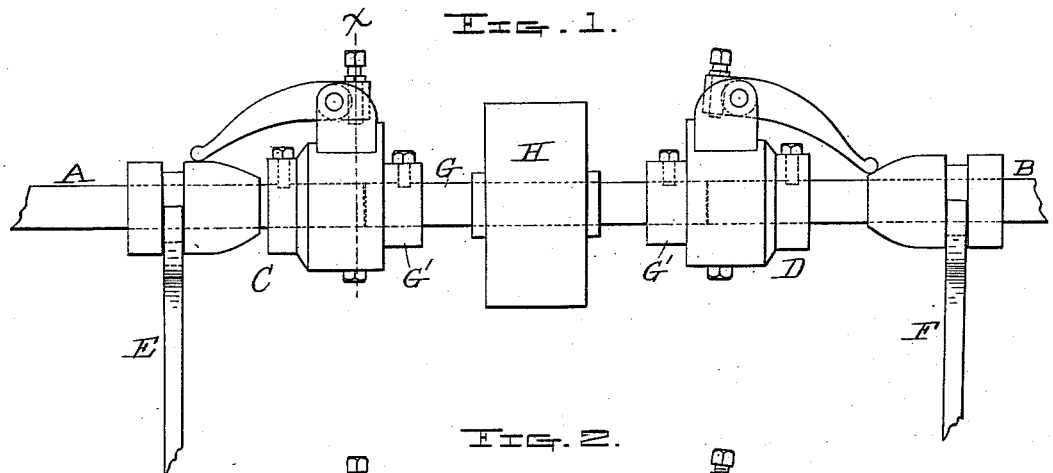
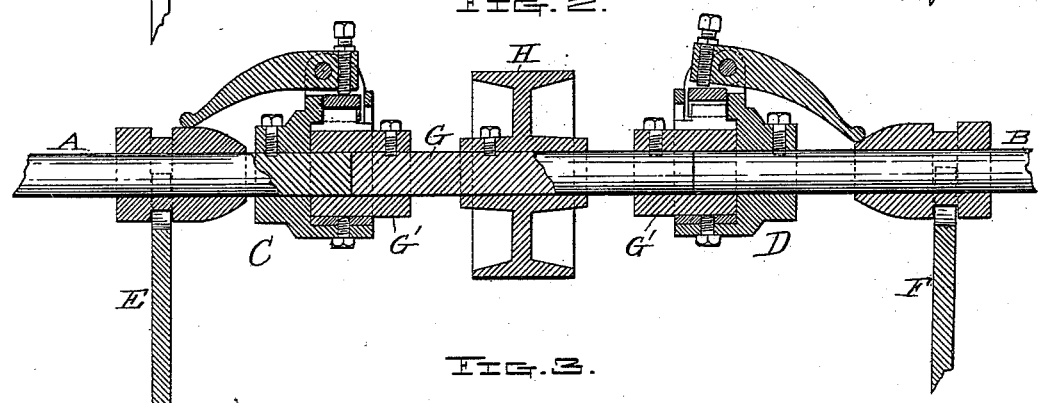
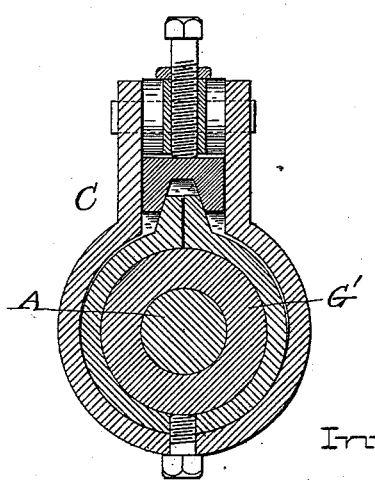
Witnesses;
Walter B. Nourse.
C. Forrest Wesson.
Inventor;
William H. Lafaelle.
By A. A. Barker. Atty

United States Patent Office.

WILLIAM H. LAFAELLE, OF WORCESTER, MASSACHUSETTS, ASSIGNOR TO ALFRED CHAPELEAU, OF SAME PLACE.

POWER-SHIPPING MECHANISM.

SPECIFICATION forming part of Letters Patent No. 420,160, dated January 28, 1890.

Application filed November 14, 1889. Serial No. 330,340. (No model.)

*To all whom it may concern:*

Be it known that I, WILLIAM H. LAFAELLE, of the city and county of Worcester, and State of Massachusetts, have invented certain new and useful Improvements in Power-Shipping Mechanism; and I do hereby declare that the following is a full, clear, and exact description thereof, reference being had to the accompanying drawings, forming a part of this specification, and in which—

Figure 1 is a side view of my improved shipping mechanism. Fig. 2 is a central longitudinal section thereof, and Fig. 3 is a transverse section upon an enlarged scale, taken on line x, Fig. 1.

The object of my invention is to provide means whereby power may be shipped and unshipped from one main line of shafting to and from two or more machines without the use of counter-shafts and pulleys; and it consists in arranging a short shaft carrying a driving-pulley and adapted to turn continuously between and upon a line with two main shafts, each having a friction-clutch mounted upon its inner end, adapted to be clutched and unclutched to and from the ends of the short shaft aforesaid, whereby the power of said continuously-rotating shaft may be transmitted to or from one or the other of said main shafts, as hereinafter more fully set forth.

To enable others skilled in the art to which my invention appertains to better understand the nature and purpose thereof, I will now proceed to describe it more in detail.

In the drawings, A and B represent the two main shafts; C and D, the friction-clutches mounted upon the inner ends thereof; E and F, the upper ends of shipping-levers for operating said clutches; G, the short section of shaft interposed between the two main shafts in alignment therewith, and H the driving-pulley mounted on said short shaft G.

Upon the outer ends of the short shaft are secured collars G' G', which extend beyond said ends to form sockets in which the ends of the main shafts A B turn, said ends being fitted therein abutting the ends of the short shaft, as is indicated in Fig. 2. The main shafts thus form bearings for the support of the short shaft and upon which said shaft turns.

The main shafts may in practice be supported, as ordinarily, by means of hanging brackets or other suitable means. Not constituting a part of this invention, it is deemed unnecessary to illustrate the same.

Any friction-clutch of ordinary construction may be employed upon the main shafts, adapted to be engaged with the collars on the short shaft or the shaft itself, as the case may be. Ordinarily a collar would be formed upon or secured to the ends, as shown in the drawings, for the purpose of obtaining a larger frictional bearing-surface for the clutches.

The main or essential feature of my invention consists not in the special construction adopted, but in the new principle resulting from the combination of these three elements, viz: two main shafts arranged in line at a short distance apart and adapted to be turned independently, and a short continuously-rotating shaft interposed between said two main shafts in line therewith, adapted to be supported by the main shafts and to have the power thereof transmitted to one or the other of said main shafts by means of a clutch or its equivalent, whereby the short shaft and one of the main shafts may be fastened to turn together.

The operation is, in brief, as follows: Assuming that the power has been applied for continuously turning the short shaft G and that both of the main shafts A and B are unclutched from the short shaft, by now operating the shipper-lever of one of the clutches, the shaft upon which said clutch is mounted is made to turn as in ordinary cases, and in consequence the machine connected therewith is set in motion without in the least affecting the machine connected with the other shaft or shafts of the main line of shafting.

It is obvious that the foregoing construction and arrangement admit of all the machines connected with one line of shafting being operated together, and by having the main shaft B in practice made in sections, with a clutch on each end adapted to engage with a short shaft G arranged between each two sections and each section driven independently, any one or more of said machines may be stopped or started independent of all the others. I am thus enabled to dispense with all the usual separate counter-shafts and pulleys required in transmitting the power from one main line of shafting to the various machines to be operated therefrom, thereby largely reducing the cost of the plant; and, furthermore, by thus dispensing with so large a proportion of the driving mechanism the main driving-shaft has a correspondingly-decreased proportion of resistance to overcome in driving the machines, and may consequently be materially reduced in size and strength to effect the same result, thus in this manner further reducing the cost of the plant.

In addition to the foregoing advantages, it will also be apparent that considerably less room is required in fitting up a plant than by the old construction and arrangement.

Having now fully described my invention, what I claim therein as new, and desire to secure by Letters Patent, is—

The improved shipping mechanism consisting of two main rotary shafts arranged in line at a short distance apart, having suitable clutches mounted on their inner ends and adapted to be turned independently, in combination with a short shaft interposed between said main shafts in line therewith, adapted to be clutched and unclutched to and from the main shafts by means of the aforesaid clutches, also fitted to turn on the inner ends of said main shafts, and having mounted thereon a driving-pulley, whereby power may be applied to continuously turn the same, substantially as and for the purpose set forth.

WILLIAM H. LAFAELLE.

Witnesses:
   ARTHUR M. TAFT,
   A. A. BARKER.